United States Patent
Dinstein et al.

(10) Patent No.: US 6,768,811 B2
(45) Date of Patent: Jul. 27, 2004

(54) SYSTEM AND METHOD FOR ANALYSIS OF IMAGERY DATA

(75) Inventors: Doron Dinstein, Tel Aviv (IL); Barak Gordon, Rishon Le-Zion (IL); Goren Gordon, Rishon Le-Zion (IL)

(73) Assignee: Magnolia Medical Technologies, Ltd., Herzelia Pituah (IL)

( * ) Notice: Subject to any disclaimer, the term of this patent is extended or adjusted under 35 U.S.C. 154(b) by 51 days.

(21) Appl. No.: 10/152,367

(22) Filed: May 21, 2002

(65) Prior Publication Data

US 2003/0095694 A1 May 22, 2003

Related U.S. Application Data

(63) Continuation-in-part of application No. PCT/IL01/01074, filed on Nov. 21, 2001.

(30) Foreign Application Priority Data

Nov. 20, 2001 (IL) .................................................. 146597

(51) Int. Cl.⁷ ............................. G06K 9/00; A61B 5/00
(52) U.S. Cl. ....................................... 382/128; 600/300
(58) Field of Search ................................. 382/100, 128, 382/129–133, 305, 306, 308, 254, 276, 279, 181; 600/300; 709/206, 231; 606/1, 32, 33; 378/1, 4, 37, 38, 91

(56) References Cited

U.S. PATENT DOCUMENTS

| | | | | |
|---|---|---|---|---|
| 4,945,478 A | * | 7/1990 | Merickel et al. | 382/131 |
| 5,235,510 A | * | 8/1993 | Yamada et al. | 600/300 |
| 5,452,416 A | * | 9/1995 | Hilton et al. | 345/783 |
| 5,803,914 A | * | 9/1998 | Ryals et al. | 600/407 |
| 5,832,488 A | * | 11/1998 | Eberhardt | 707/10 |
| 6,006,191 A | * | 12/1999 | DiRienzo | 705/2 |
| 6,022,315 A | * | 2/2000 | Iliff | 600/300 |

* cited by examiner

Primary Examiner—Jayanti K. Patel
(74) Attorney, Agent, or Firm—Davidson, Davidson & Kappel, LLC

(57) ABSTRACT

A medical diagnostics system and method enhanced by the application of an imagery data analysis instrument operative in the processing of imagery data for the purpose of generating meaningful imagery data summaries through the use of complexity calculation.

31 Claims, 6 Drawing Sheets

SYSTEM AND METHOD FOR ANALYSIS OF IMAGERY DATA

RELATED INVENTIONS

This application is a continuation-in-part of International Patent Application No. PCT/IL01/01074, for METHOD AND SYSTEM FOR CREATING MEANINGFUL SUMMARIES FROM INTERRELATED SETS OF INFORMATION UNITS filed on Nov. 21, 2001, the disclosure of which is incorporated herein by reference.

FIELD OF THE INVENTION

The present invention generally relates to a system and method for summarizing information units and evaluating the summarized information. More specifically, the present invention relates to the summarizing of an image data record by selecting a particular aspect of the record and manipulating the record such that a meaningful evaluation thereof is accomplished.

DISCUSSION OF THE RELATED ART

Medical diagnosis or the identification of a disease or a specific medical condition from its symptoms has long exceeded its dictionary definition. Currently, medical diagnosis relies substantially on a multitude of laboratory tests and high-technology diagnostic tools. These procedures include a plurality of laboratory examinations such as biochemical tests, blood tests, microscopy, diverse imaging procedures and the like.

Today, the average patient entering any given Emergency Room (ER) ward will most likely be given, after a brief physical examination, a wealth of diagnostic investigations using a multitude of investigative tools. The diagnostic tools will typically include traditional laboratory tests, such as Electrocardiogram (ECG) and X-ray photography. If needed, further diagnostic tools will be applied such as Ultrasound (US), Computed Tomography (CT) and the like. The diagnostic tools provide the physician with a wealth of information regarding the anatomy, physiology and pathology of the patient. Diagnostic tools have been evolving rapidly during the last few decades due mainly to advances in the understanding of the human biology as well as to accelerated progress in computing and imaging techniques. The rapid development of diagnostic evaluation tools has brought about a plethora of information to the attending physician. In order to apply the appropriate therapy or to initiate the performance of further tests, physicians must read and interpret the data provided by the diagnostic tools within minutes. Proper and precise assessment, evaluation and interpretation of the data provided by most diagnostic tools require ample time and proficiency, exactly two of the things that most physicians do not possess in a realistic medical environment. Thus, the problem of assessing, evaluating and interpreting the information provided by the diagnostic tools, particularly those operative in the field of imaging, has led to the creation of a special subspecialty of physicians capable of assessing the data produced by diagnostic tools during a relatively short period of time with relatively high accuracy. Still, even radiologists are incapable of observing the entire range of details associated with the data provided since the capacity of the ordinary human senses is naturally limited. The human brain can handle only a limited amount of information in a given period of time concerning the decision which of the information is relevant and which is unimportant. In addition to these natural limitations, a human observer is never free of external interruptions and internal interferences that may obscure and distort the perceived pattern of the data received. Furthermore, the human capability of observing minute, subtle changes in high-volume data and evaluating the importance of the perceived changes is typically inadequate. The above-mentioned interruptions, interferences and natural limitations apply not only to radiologists but also to all humans operating in the field of medical diagnostic evaluation such as pathologists, laboratory technicians, physicians of all specialties, and the like.

There are relatively small number of working solutions to overcome the limitations in the evaluation, assessment and the interpretation of diagnostic tools in the medical field. Most of these solutions involve the application of mathematical models, such as, for example, the Fourier analysis and other similar techniques.

Due to the considerable amount of erroneous interpretations (false positive, false negative) most health practitioners avoid using such interpretations of data provided by the diagnostic tools. Although some diagnostic tools such as special Ultrasound (US) machines summarise parts of the information and display the summary to the user in a form that is easier to understand, such summary does not include any meaningful evaluation and still requires expertise in the evaluation thereof. The above-mentioned diagnostic tools are typically very expensive and difficult to operate such that a specifically trained medical operator is required for the correct interpretation thereof. There is therefore a need in the art for a rapid, accurate, integrated and cost-effective system and method for summarising and evaluating image data records obtained from medical diagnostic investigation tools.

Presently available computer facilitated methods for evaluating medically related data is insufficient. An important aspect of the present invention is the selection of complex, important and significant sections of data, which allows the viewing of meaningful extracts. The cost of evaluating medically related data is substantially high because of a number of reasons. Most techniques for assessment, evaluation as well as summarizing medical data require training of personnel in the technique procedure and application. In addition, personnel performing such tasks, require substantial knowledge and training in the actual subject matter. Furthermore, there is an enormous amount of data being produced from examination devices such as imaging examination devices as well as from other devices such as communication and systems devices. It is virtually impossible, if only from a time availability point of view, for medical personnel needing to access information, to perform a required task without having access to summary information presentations, unless additional time is spent. Another advantage of the present invention involves human observation limitation of data amount and detail change. The present invention enhances and stress relevant parts of the data thus allows a human observer to concentrate on relevant data and details otherwise blended within vast amounts of data, as well as present it to the user in a simplified manner. The present invention also provides for a meaningful summary and evaluation of three-dimensional images typically containing a large quantity of information.

All aspects mentioned above are significantly costly and demonstrate the need in the art for an improved method for producing meaningful, accurate and effective summary data. The present invention represents a significant advance in summarizing techniques.

SUMMARY OF THE PRESENT INVENTION

One aspect of the present invention regards a medical diagnostics system enhanced by the application of an imagery data analysis instrument operative in the processing of imagery data for the purpose of generating meaningful imagery data summaries. The system comprises an imagery input device to acquire imagery data of subjects and to transmit a stream of the acquired imagery data to associated data processing apparatus. The system further comprises data processing device associated with the imagery input device. The data processing device comprises data storage device for storing the stream of acquired imagery data, to store imagery data processing control parameters and to store programs constituting the imagery data analysis application. It further includes a processor device to process the stream of imagery data through the application of the imagery data analysis application and an imagery data analysis application for the generation of meaningful summaries of the imagery data received from the at least one imagery input device and a user interface device to enable the users of the system to control suitably the operation of the system.

Another aspect of the present invention regards a medical diagnostics method utilizing an imagery analysis mechanism for the purpose of creating meaningful summaries of imagery data, the method comprising the steps of acquiring a stream of imagery data of a subject via an 1 imagery input device. Processing the imagery data for the purpose of generating meaningful imagery data summaries. Presenting the meaningful imagery summaries to a user.

Other objects and advantages of the present invention will be evident to the person skilled in the art from a reading of the following brief description of the drawings, the detailed description of the present invention, and the appended claims.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENTS

Figure 1:
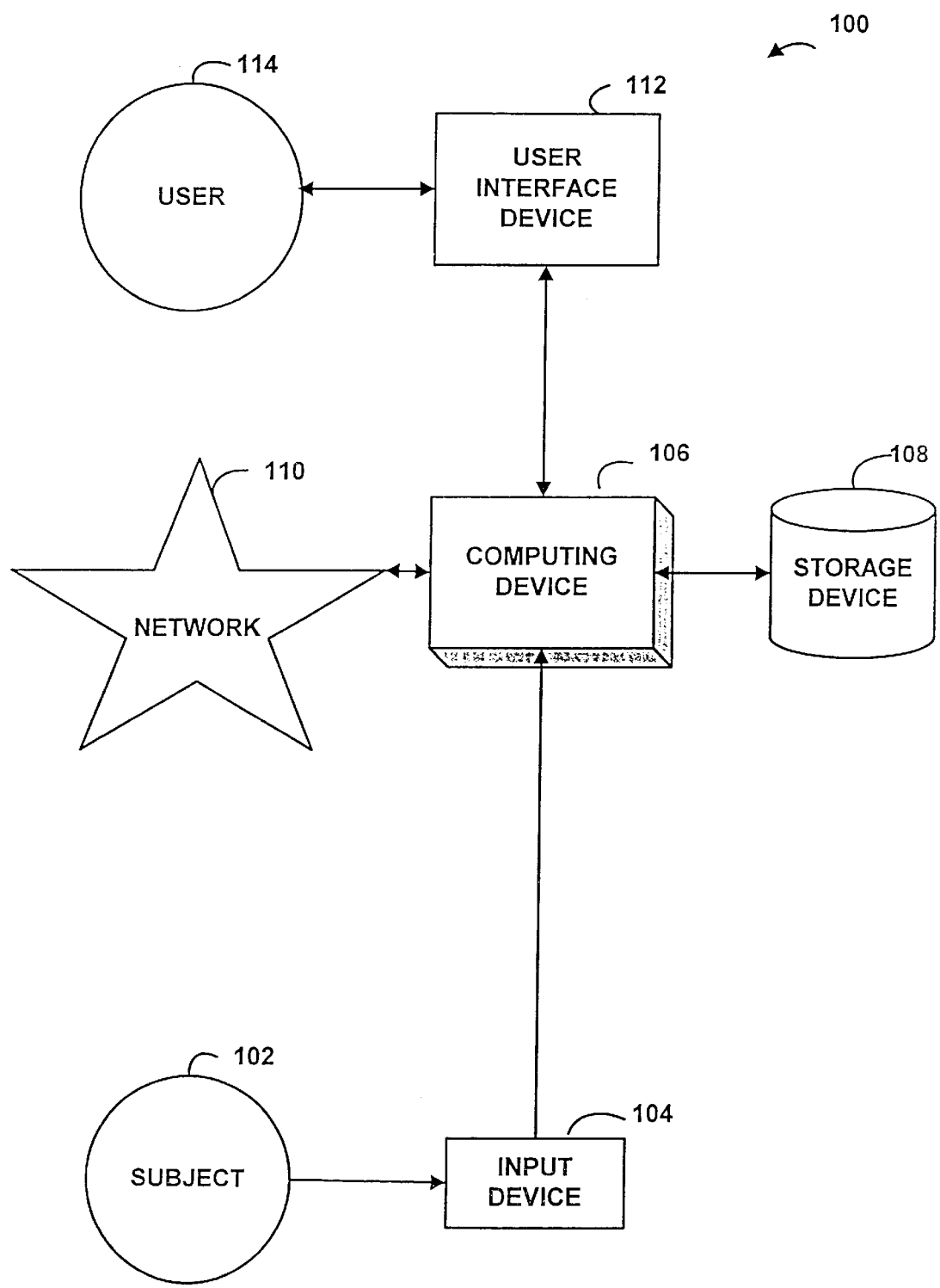
FIG. 1 is a schematic block diagram of an exemplary system infrastructure of the present invention.

This application is a continuation-in-part of International Patent Application No. PCT/IL01/01074, for METHOD AND SYSTEM FOR CREATING MEANINGFUL SUMMARIES FROM INTERRELATED SETS OF INFORMATION UNITS filed on Nov. 21, 2001, the disclosure of which is incorporated herein by reference.

A novel method and system for the meaningful summarizing of information units is disclosed. The system and method is operative in introducing an aggregate of information units into a computing environment in order to derive the most interesting and significant aspects of the information. The data aggregate consists of a plurality of logically inter-related information units having diverse formats, such as images, video, audio, graphics, text, database records and the like. In the preferred embodiments of the present invention the information units represent medical diagnostic images. The information is typically obtained via a medical diagnostic imaging tool such as a CT machine observing a human subject. The information units, such as images and video data records, are processed by a set of specifically developed computer programs, which effect the division of the data records into fragments or blocks having substantially identical dimensionality. The division of the data records by the programs is performed in accordance with predetermined parameters associated with the format and the content of the data record collection. Each of the dimensionally substantially identical record fragments assigned an arbitrarily predetermined complexity value by a set of specifically developed computer programs that calculate the complexity value of the fragments in association with predetermined processing parameters. The division of the related data records into multiple fragments having identical dimensionality, the assignment of the complexity value to the fragments, and the subsequent organization of the data fragments, provides the option of creating a specific summary view and a specific perspective of the original information. Complexity summary is transformed into an indicative parameter, which is a calculated value with a practical meaning. The transformation is achieved by using pre-defined data including baseline imagery data, medical data and other relevant data. The indicative parameter is then transformed into a human readable final result that could be an indication for medical action, a diagnosis, a prognostic element, a response to therapy and the like.

The complexity value calculation requires no a-priori knowledge of the diverse media and the associated application. The extrapolation of the indicative parameter, done with specially tailored functions, and the final result are dependent on many aspects of the field and questions at hand thus they are dependent on a priori knowledge. For example, when examining the response to radiotherapy in a patient with brain cancer, a priori knowledge of prior brain images of the patient is required. The prediction accuracy of the system increases as more information is fed to the system before hand. For example, if the pattern of response to radiotherapy of brain cancer from many patients is calculated with the indicative parameter formula, a greater accuracy as to the "normal" or "acceptable" response can be easily calculated when compared to essentially the same data involving only few patients.

The preferred embodiments of the present invention relate to a method for facilitating the selection of the most interesting or significant aspects, from a large group, set or collection of information, more specifically medical imagery data, video data files and other related data, and the extraction of meaningful information. The following description of the method and system proposed by the present invention includes several preferred embodiments of the present invention. Through the description of the embodiments specific useful applications are disclosed wherein the elements constituting the method process suitably the collection of data records associated with the application. It can be easily appreciated by the person skilled in the art that the preferred embodiments described hereunder in the following description and the associated drawings are exemplary only.

FIG. 1 illustrates an exemplary system 100 within which the method suggested by the present invention could be implemented. The system 100 is operated by a user 114 and includes a user interface device 112, a computing device 106, a storage device 108, an input device 104, and a communications network 110. The various elements of the system 100 constitute a suitable infrastructure operative in the application of the suggested method. Input device 104 is an image-acquiring device capable of acquiring and handling a set of static and a sequence of dynamic images from a specified target. Device 104 could be a CT, a US, a 3D US, a MRI, an endoscope, an X-ray machine, a Mammography device, a PET scanner device, and the like. Exemplary input devices could include the Philips Elite-1200 CT picker, the Hewlett Packard Sonos 2500 US-ECHO, the GE Medical Signa Horizon LX 1.5T, the Pentax Sci-Lab endoscope, the GE Medical Revolution XQ/I X-ray machine, the Philips Mammography device, the Siemens PET scan device and the like. Input device 104 acquires image information from subject 102 in a fashion related to input device 104 mode of operation. For example, an X-ray input device and a CT input device obtain electromagnetic wave information in the X spectrum and translate such information so as to produce a digital imagery representative of data obtained. The images obtained could include one or more separate static images such as in the case of X-ray photography, a set of multiple inter-related possibly overlapping static images such as in the case of a CT device and dynamic images such as in the case of an US device. Static and dynamic images can be obtained by any one input device such as dynamic video images obtained by an endoscope device as well as a static image obtained by freezing and capturing one frame of the dynamic video images. After acquiring relevant information, input device 104 transmits the captured and transformed information as a data record to computing device 106. Transmission of the data information record from input device 104 to computing device 106 can be either in a wireless or in a wired fashion in the standard manner known in the art. For purposes of clarity only one input device 104 is shown in FIG. 1. It will be evident to the person skilled in the art that a plurality of input devices 104 and different types of input devices 104 can be connected to the computing device 106. User 114 can manipulate input device 104, such that the input device 104 views special regions of interest. Certain operational modes are executed during the operation of input device 104. Input device 104 can also be manipulated in a pre-programmed manner by computing device 106 as to all aspects of operation such as subject 102 scanning locations, operational mode and the like. Subject 102 is typically a human subject but not necessarily undergoing a medical imaging examination. However, subject 102, can be any organism or a part of an organism under investigation, such as pathological specimens under a video microscope and the like. Computing device 106 operative in the reception and manipulation of the image data information records. Device 106 could be a computing platform, such as a dedicated microprocessor, a multi-functional Personal Computer (PC), or a central mainframe computer. Device 106 incorporates suitable program routines including a set of specifically designed and developed program instructions responsible for the manipulation of the image information data record. Computing device 106 can obtain the image information data record from the local input device 104, the local storage device 108 and from diverse remote data sources implemented across the communications network 110. Device 106 is capable of converting analog imagery data obtained from input device 104 to a digital format. The converted data then undergoes within device 106 complexity, indicative parameter as well as final result calculation is performed thereof. Computing device 106 is also operative in transferring information to storage device 108, to user interface device 112, and to remote locations via network 110. Computing device 106 can also be functional in manipulating input device 104 as previously described above. Network 110 is a computer network such as the Internet, Intranet, local area network (LAN), wireless local area network (WLAN) and the like. Network 110 is operational in receiving and delivering input and output information to and from computing device 106. The received and delivered information could be image data information records, complexity calculations, indicative parameters, final results, subject related information, and other relevant material. Storage device 108 can be a hard disk, a magnetic disk, an optical disk, a mass storage device, or an SDRAM device operative in storing data such as image data information records, complexity calculation results, indicative parameters, final results, subject related information, disease related information, operational related information and other relevant information needed for the operation of system 100. User interface device 112 is a computer monitor, a television screen, a personal digital assistant (PDA), and the like. User interface device 112 is operative in providing suitable interaction between user 114 and the other components of the system 100r User interface device 112 can be functional in displaying input device 104 image data in real time, displaying complexity summaries, indicative parameters, final results and other relevant information such as identification data, personal data, health data, medical history data and the like. User interface device 112 is also functional in providing user 114 with the option of manipulating computing device 106 parameters, allowing user 114 to interact with storage device 108, input device 104 and providing the reception and transmission of information through network 110. User 114 is typically a physician desiring to obtain medical information from subject 102 via the examination performed by input device 104. User 114 could also be a a medical technical expert operating system 100 concerned with evaluating certain aspects of information obtained by input device 104.

Figure 2:
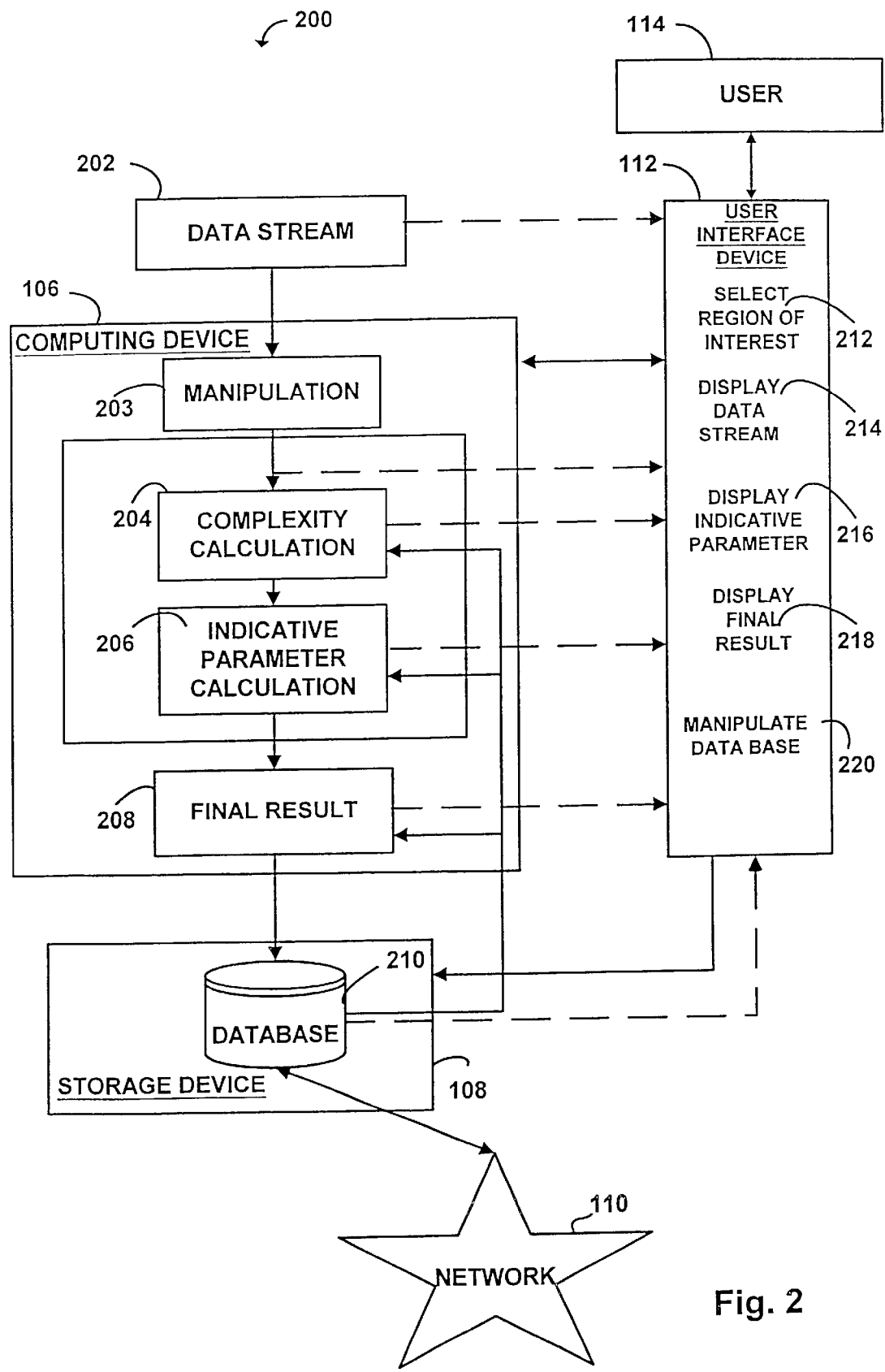
FIG. 2 is a simplified flow chart illustrating the operation of the system and method of the present invention.

Turning now to FIG. 2 where a simplified flow chart illustrating the operation of the system and method of the present invention is demonstrated and where the system is referenced 200. Data stream 202 is acquired by input device 104 of FIG. 1 by appropriately sensing an examined target is transmitted to computing device 106 of FIG. 1. Data stream 202 can be a static image data record, a static three-dimensional image data record, a dynamic image data record, a dynamic three-dimensional image record, ancillary data records typically accompanying imagery data records, such as audio data record, text data record and the like. Data stream 202 is transmitted to computing device 106 in wired or wireless fashion in a manner known in the art. Data stream 202 received by computing device 106 is optionally manipulated in step 203. The manipulation may include analog to digital (ATD) conversion, color correction, brightness correction, contrast correction and any types of processing typically performed on imagery data records in order to enhance input purity. The data stream then undergoes a complexity calculation 204 in order to create a complexity file (not shown) containing complexity parameters of at least a substantially small part of the data stream defined by user 114 of FIG. 1 or predefined within computing device 106. The complexity file created through the complexity calculation 204 can also include a cumulated complexity parameter of substantially all parts of the data stream that underwent complexity calculation. Complexity file can incorporate there within complexity calculations of a substantially small part of image data record, substantially all image data record, ancillary data records as well as any other data record capable of undergoing complexity calculation. Different image types and auxiliary data records can be processed by complexity calculation 204. Complexity calculation 204 is a calculation internal to computing device 106, and is independent of any external information. Several internal manipulations of the parameters used for complexity calculation 204 can be executed in order to optimize computing device 106 operation but are independent of the data stream 202 as well as the examined object (not shown). The parameters are optionally stored and fed to the computing device 106 from database 210 stored at the storage device 108 of FIG. 1. Next, an indicative parameter calculation 206 is performed. Indicative parameter calculation 206 is an evaluation of complexity calculations stored within the complexity files. For example, complexity calculations within a complexity file, created by complexity calculation 204, can be compared to previous or predefined complexities fed to computing device 106 from database 210 or from other sources such as network 210 and the like. Indicative parameter calculation 206 is then performed by feeding complexity calculations into predefined mathematical formulas having predefined parameters as stated above. Next, final result 208 calculation is performed using indicative parameter calculation results. Final result is user-friendly representation of indicative parameter result such as a probable diagnosis, a suggested course of action, a suggested therapeutic indication, an assessment of the response to a prior therapy and any other format pertinent to the specific examination. Such format may include an image, a stream of images. Such image or stream of images may provide guided assistance including through the projection of graphic means to assist in the treatment or course of action suggested. The final result is then transmitted to database 210 implemented in storage device 108 of FIG. 1. Complexity calculation results and indicative parameter calculation results obtained at steps 204 and 206 respectively are also stored in database 210. Database 210 also comprises calculating parameters for the above-mentioned calculation, previously obtained medical, personal, and other data relating the operation of system 200. Database 210 could also store all data streams obtained by input devices and from other data sources such as network 110 and the like. Information stored on database 210 can be retransmitted to computing device 106 and to the user interface device 112 of FIG. 1 by demands introduced by user 114 and by predefined parameters within computing device 106. In the typical operation of system 200, user 114 interacts with the system via user interface device 112 (UID). User 114 can perform the interaction by utilizing suitable devices, such as a pointing device (mouse), a touch screen device (stylus), an audio device (microphone) or any other method for user system interaction. UID 112 is operative in allowing user 114 to select practically any region of interest 212 of data stream 202 fed to computing device 202. The selection could be performed optionally at any step of the operation, such as after manipulation step 203, complexity calculation 204 and the like. UID 112 can display essentially any part of data stream 214, display indicative parameter results 216 as a numeric value, as a graphical illustration, a pictorial representation and the like. UID 112 can also display final result 218 in diverse user-friendly formats Using UID 112, user 114 can also manipulate database 220 such as for manipulation of parameters definitions, manipulation parameters, for saving, displaying, transmission of information and the like.

Figure 3:
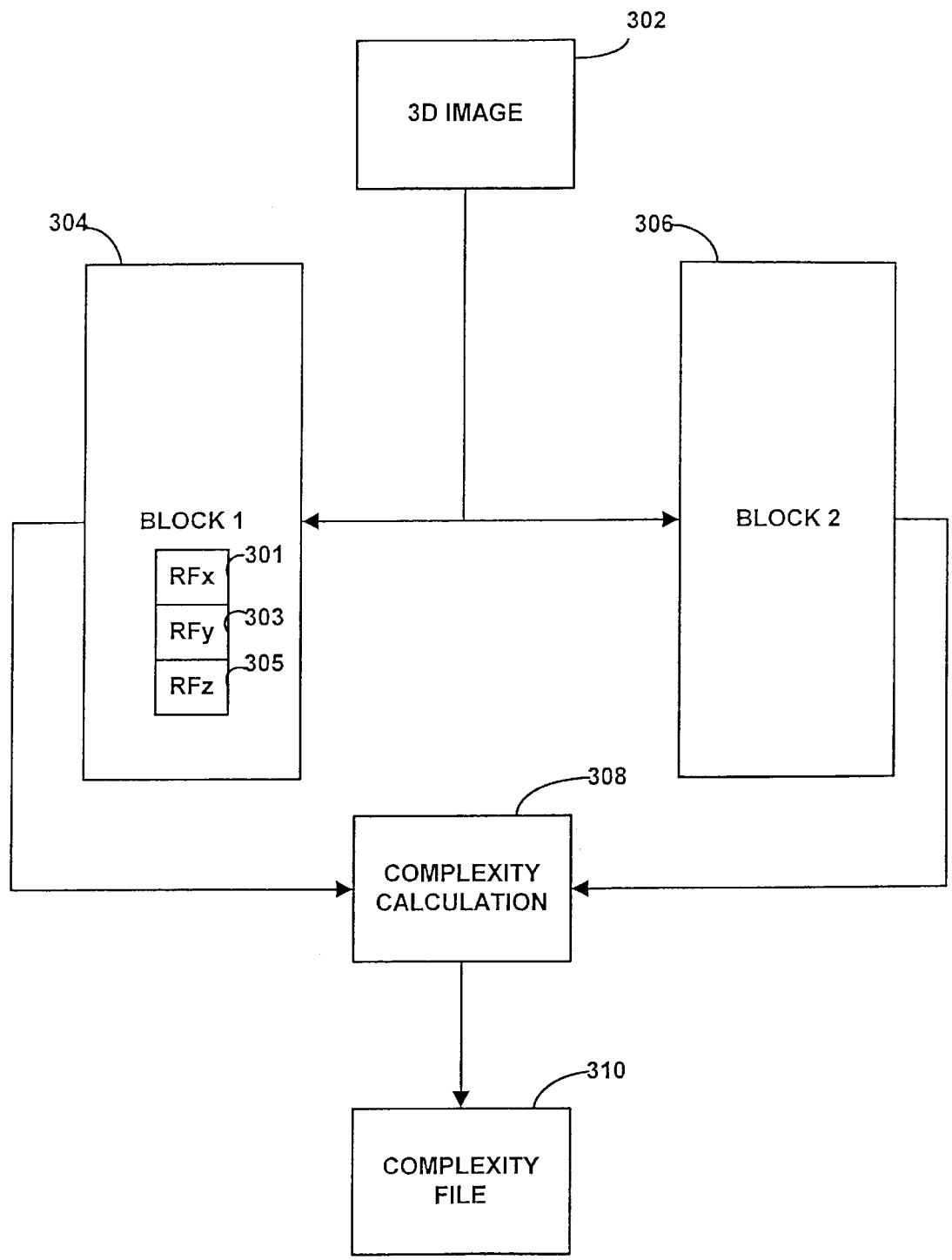
FIG. 3 is a simplified block diagram of an exemplary complexity calculation for a three dimensional image.

Turning now to FIG. 3 where an overview of a complexity calculation of a three dimensional image is discussed. Currently images obtained via input devices such as a CT, an MRI, a US device and the like are reconstructed to a three dimensional image. In addition some newer devices are capable of producing three-dimensional images. The interpretation of three-dimensional (3D) data is a complex process due to the vast amount of data contained there within. Using complexity calculation of three-dimensional images can facilitate the analysis and summary of 3D images. In a three-dimensional (3D) image the image data stream comprises three axes. Complexity calculation of such data involves calculation in three axes x, y and z. The x and y axes comprise a longitudinal and horizontal location of the image while the z axis contains the depth location. A three dimensional image (3D-image) is divided into multiple blocks having multiple reading frame possibilities. The reading frames are typically in the x, y and z axes and each contain preferably more then one pixel value but typically less pixel values comprising the whole block. Complexity calculation is performed for each block as described here and below. This resulting complexity parameter is stored in a file containing a complexity block matrix.

Still referring to FIG. 3 where an exemplary 3D-image is referenced as 302, block 1 and block 2 are referenced 304 and 306 respectively, where reading frames x, y and z of block 1 are numbered 301, 303 and 305 respectively and where complexity calculation is referenced 308 and complexity file is referenced 310. In the exemplary block diagram illustrated in FIG. 3 an exemplary 3D-image 302 such as a 3D US video image, a 3D CT image reconstruction of multiple images obtained via a CT scan is illustrated. Image 302 is acquired by an input device 104 of FIG. 1 then transferred to computing device 103 of FIG. 1, there within image 302 is divided into multiple blocks such as block 1 (304) and block 2 (306). Although only two blocks are illustrated in FIG. 3 for simplicity, it should be clear to one with ordinary skills in the art that any 3D-image can be divided into any number of blocks. Block 1 (301) comprises reading frames, RFx 301, RFy 303 and reading frame RFz 305. A multitude of different reading frames 301, 303 and 305 is possible for block 1 (304). Block 1 (304) and block 2 (306) undergo complexity calculation 308. A complexity calculation result for each block is then transferred to a complexity file 310 such that complexity file 310 contains a complexity metric of all reading frames of all blocks obtained from 3D-image 302.

Figure 4:
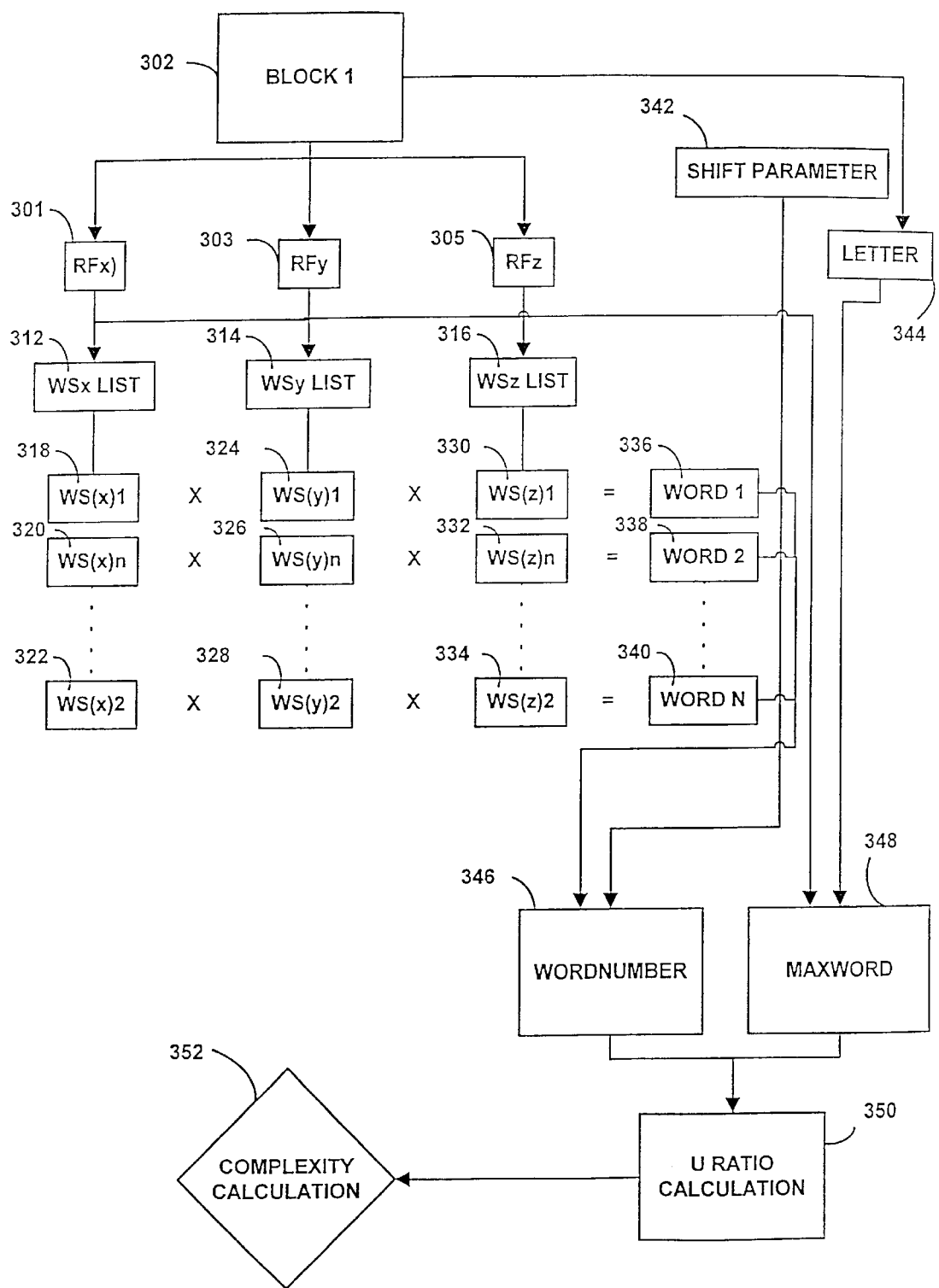
FIG. 4 is a simplified block diagram of an exemplary production of complexity file for a three dimensional image.

Turning now to FIG. 4 where a simplified block diagram of the complexity calculation of each block is described and where each reading frame comprises a multitude of possible sequences referred to herein as Wordsize. The use of the terms "Word" and "Letter" and such similar terms in the context of the present invention is associated with the use of pixels or a sequence of values of pixels within an image or a series of images. It will be appreciated such use is made for the sole purpose of better describing the workings of the present invention, and that such use is in no way limiting to the term Word. Each Wordsize contains a sequence of values of pixels referred to herein as letters. Any number of Wordsize combinations is possible and each Wordsize combination is referred to herein as a Word. In order to calculate complexity the maximum number of Words and the number of different Words must be calculated. The calculation of the maximum number of different Words or Wordsize combinations is derived by either calculating the number of different Wordsize for each letter or by the maximal different words in a given block. Calculating the number of different Words is performed by counting the different number of Words using the Words and a shift parameter. A ratio of maximum number of different words and the count number of different words is then used for the final calculation of complexity of that block. FIG. 4 illustrates block 1 referenced 302 of FIG. 3, three reading frames RFx, RFy and RFz referred to as 301, 303 and 305 respectively of FIG. 3. Also illustrated are Wordsize lists 312, 314 and 316 respectively and Wordsize 318 through 334, words 1, 2, and N referenced 336, 338 and 340 respectively. In addition Shift parameter is referenced 342, letter referenced 344, WordNumber and MaxWord referenced 346 and 348 respectively. Also depicted is U ratio referenced 350 and complexity calculation 352. Complexity calculation of block 1 302 is performed such that for each reading frame RFx 301, RFy 303 and RFz 305 a word size list is created such that WSx list 312 is the word size list of RFx 301, WSy list 314 is the Wordsize list of RFy 303 and WSz 316 list is the Wordsize list of RFz 305. For each reading frame 301, 303 and 305 Wordsize are created such that for RFx 301 Wordsize (WS)(x)1 318, WS (x)2 320 and WS(x)n 322 are created. For RFy 303 WS(y)1 324, WS(y)2 326 and WS(y)n 328 are created. For RFz 305 WS(z)1 330, WS(z)2 332 and WS(z)n 334 are created. Although only three Wordsizes (WS) are depicted for each reading frame it would be clear to one with ordinary skills in the art that an N number of Wordsizes can be created for each reading frame. Words 336, 338 and 340 are calculated by multiplying Wordsize such that word 1 336 is calculated by multiplying Wordsize (WS)(x)1 by WS(y)1 by WS(z)1. Calculation of word 2 (338) is executed by multiplying WS(x)2 by WS(y)2 by WS(z)2. The calculation of word N 340 is accomplished by multiplying WS(x)n by WS(y)n by WS(z)n. Although only three words are depicted in FIG. 4 it would be clear that any number of words depending on the number of Wordsize are possible. Using Wordsize lists 312, 314 and 316 together with appropriate letter 344 values, computing device 103 of FIG. 1 calculates the number of maximum different words possible also referred to herein as MaxWord 348. MaxWord 348 can also be calculated from the maximum possible words in a given block. The calculation of WordNumber 346 is accomplished by counting the different words, in the illustration brought forward by addition of word 1 336, word 2 338 and word N 340. Shift parameters 342 are predefined constants allowing a simplified WordNumber 346 calculation by using predefined shift calculation of all words such that word 1 336 is accomplished by multiplying WS(x)1 318, WS(y)1 324 and WS(z)1 330. Then using a shift parameter computing device can easily calculate all other words thus enabling the calculation of WordNumber 346 by adding all words. U ratio calculation 350 is then accomplished by using WordNumber 346 and MaxWord 348. Resulting U ratio is then used for complexity calculation 350.

Figure 5:
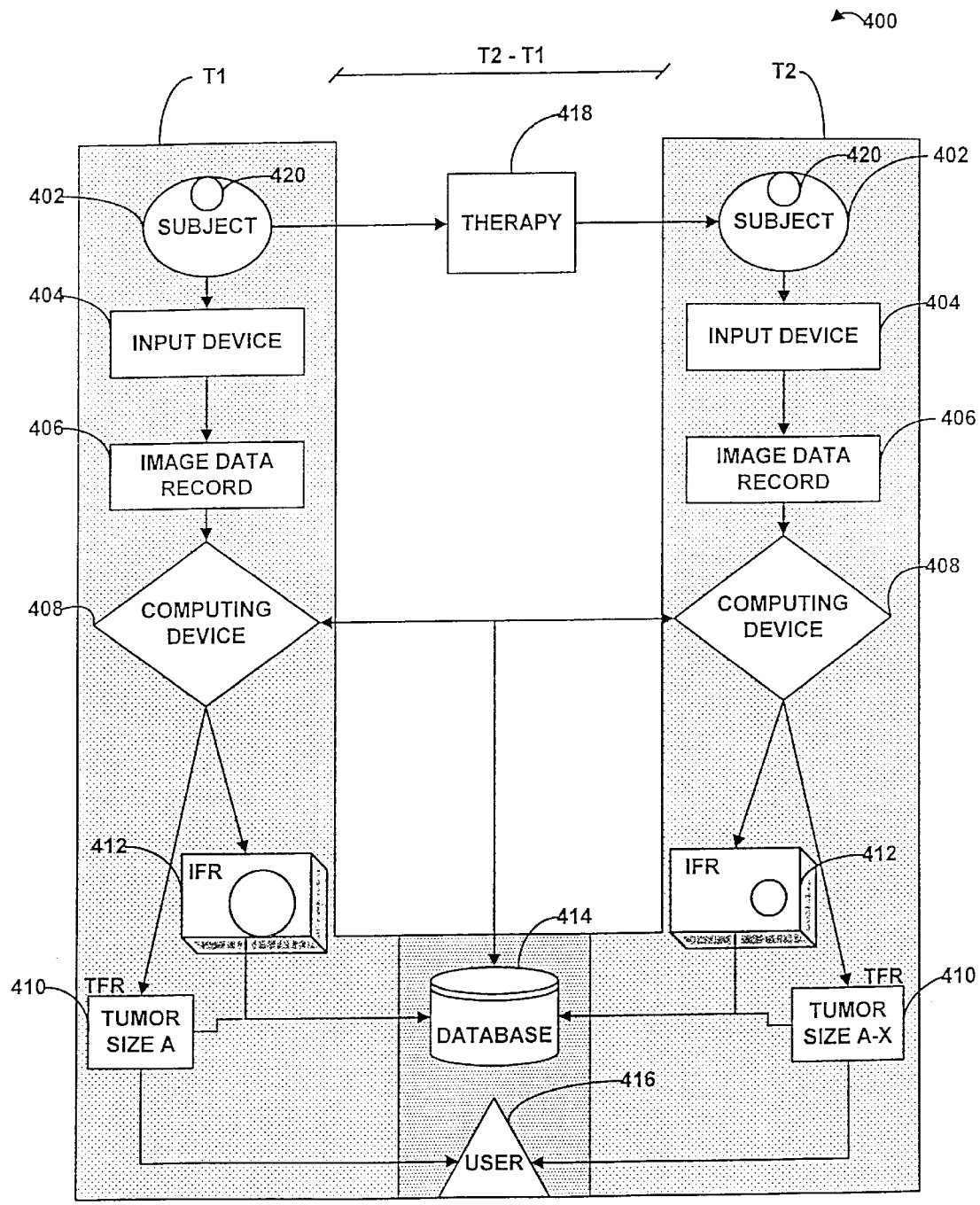
FIG. 5 is a simplified flow chart illustrating the operation of the present invention according to the first preferred embodiment.

Turning now to FIG. 5 where a flow chart illustration of a typical operation of the system in accordance with the first embodiment of the present invention is illustrated and where the typical operation involves an imagery early prediction of response to therapy. In such an operation, a response to therapy using imagery data such as a two dimensional image as well as a three dimensional image and complexity calculation is illustrated where system 400 is illustrated at two subsequent time frames T1 and T2 and where time interval T2−T1 (ΔT) is sufficient for therapy evaluation using system 400. System 400 comprises subject 402, input device 404, image data record 406, computing device 408, text final result 410, image final result 412, database 414, user 416 and therapy regimen 418. In the typical operation of system 400, subject 402, (for example a patient with a brain cancer), is submitted to an imagery evaluation examination such as a dwMRI, dwMRT, MRI, CT, 3D CT image reconstruction, and the like at time T1. Input device 404 such as a MRI machine obtains imagery information of a selected region of interest 420 of subject 402, such as the brain. Image data record 406 preferably in digital format, for example a digital MRI image of a brain section with a tumor, is sent to computing device 408 where complexity calculation, indicative parameter calculation and final result calculation (all three not shown) are performed on the imagery data. Complexity calculation can be performed on a small part of the image as well as on the entire image as previously described. The parameters for this calculation can be defined or predefined within computing device 408. Output of computing device 408 is typically, but not exclusively, in the form of final result (not shown) and is displayed typically but not exclusively as Text Final Result (TFR) 410, such as: "Tumor of type A", "Tumor of complexity A", "Tumor of consistency A" etc. Output 408 can also be displayed as Image Final Result (IFR) 412, such a MRI image of the brain with the tumor delineated, both in a user-friendly format. IFR 412 and TFR 410 are sent for storage in database 414 and are displayed to user 416 preferably via user interface device 112 of FIG. 2. During time interval AT (T2−T1) subject 402 receives therapy such as radiotherapy and/or chemotherapy for the purpose of reducing or eliminating the brain tumor. At time T2 after time interval an image data record 406 of selected region of interest 420 of subject 402 is obtained by input device 404. For example a patient with brain tumor obtained at time T1 is having a MRI image of the same region at time T2. Image data record 406 of the same region of interest 420 at time T1 is now transferred to computing device 408 where complexity calculation on the obtained data is then performed. Computing device 408 obtains images and respective calculated data processed at time T1 and stored in database 414. Computing device 408 then uses this data and other parameters and calculates a new indicative parameter and a new final result (not shown). Output of computing device 408 is typically but not exclusively in the form of final result (not shown) and is displayed typically but not exclusively as Text Final Result (TFR) 410, such as: "Tumor of type B", "Tumor of complexity B", "Tumor of consistency B" etc. Output 408 can also be displayed as Image Final Result (IFR) 412, such a MRI image of the brain with the tumor delineated, both are easily understandable to user 416. In the example at hand tumor type A at time T1 is of the complexity B at time T2 thus tumor type complexity has changed during time interval ΔT. Thus, the tissue examined is characterized by the complexity value it is assigned. Complexity values are assigned prior to and after treatment or at predefined intervals. Treatment is provided based on the complexity values of the tumor type at any specific time. The various complexity results enable a non-invasive tissue characteristic analysis. The same can be easily perceived by observing the complexity result of circle 412 at time T1 and T2 respectively. Output of system 400 can be in any other format known in the art IFR 412 and TFR 410 are then sent for storage in database 414 for later evaluation, transfer etc. and displayed to user 416 preferably via user interface device 112 of FIG. 2. During the operation of system 400 at both times T1 and T2 the user 416 can manipulate all the elements of the system, such as selecting a new selected region of interest 420, observing any imagery data obtained by input device 404 or stored on database 414, print a hard copy of image data record 406, IFR 412, TFR 410 and the like. System 400 can also be used for other purposes such as reaching a diagnosis, next step of investigation indication, therapeutic indications, prognosis evaluation and other purposes suited for medical and other fields. System 400 configuration can be used with other static image input devices such as an endoscope device such as an Endoscope from Olympus, and for evaluating skin lesions obtained by an image input device, such as a camera from Canon. The present invention can also be operational for evaluating images obtained from a pathological specimen such as by a camera, a microscope camera, a miniature camera, an electron microscope camera and the like.

It should be evident to one with ordinary skills in the art that the illustration brought here and above is but an example, and many other uses and configurations of the system are possible within the scope of the present invention.

Figure 6:
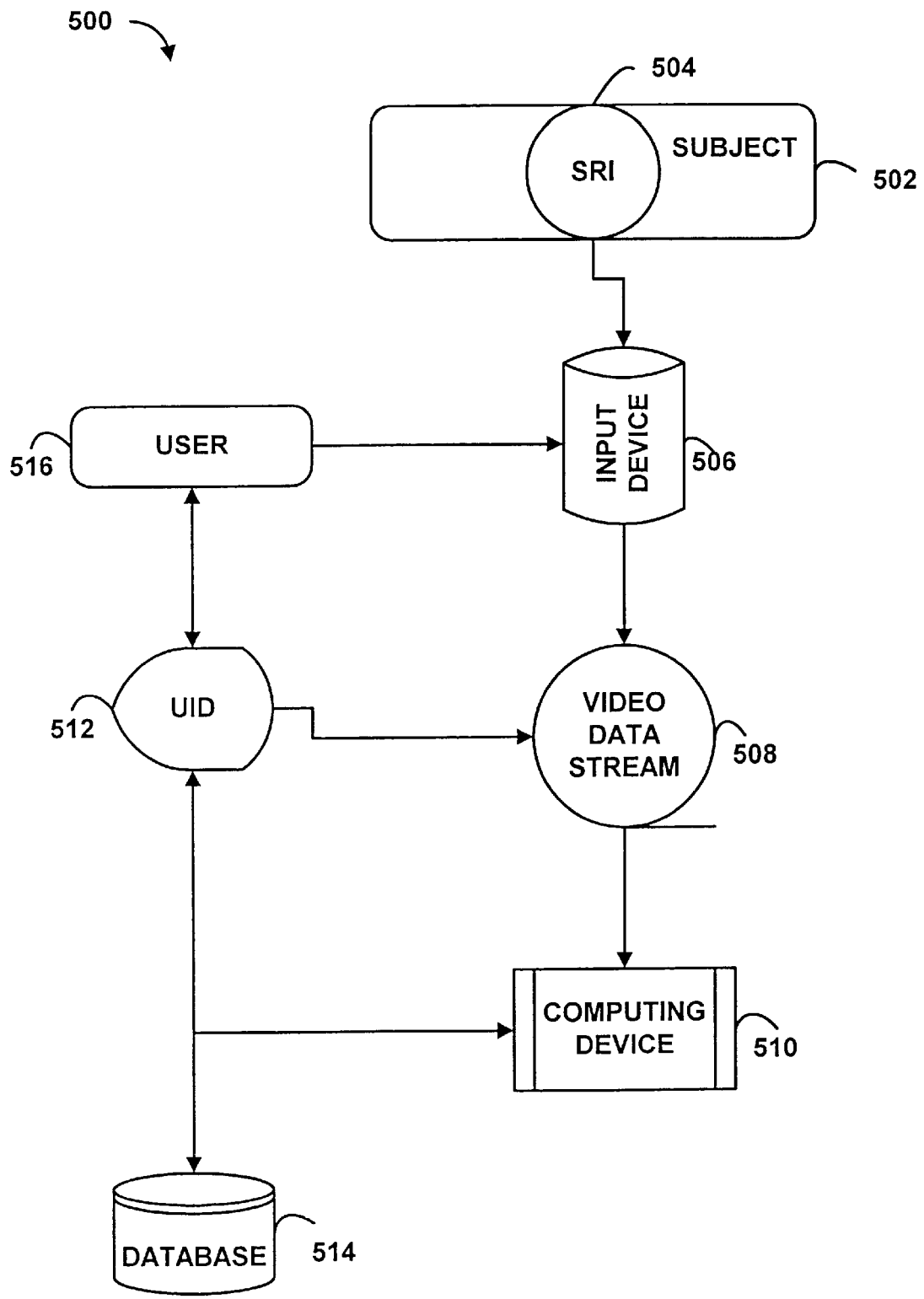
FIG. 6 is a simplified flow chart illustrating the operation of the present invention according to the second preferred embodiment.

Turning now to FIG. 6 which is a flow chart of the second preferred embodiment of the present invention. System 500 is functional in the evaluation of medical video data such as data obtained by an US machine, a US/Doppler machine, an ECHO machine, an Endoscope device, a three dimensional ECHO and comparable instruments known in the art. System 500 is illustrated here and below for the purpose of identifying heart defects via the utilization of an ECHO machine. It should be clear to one skilled in the art that this representation is an example only and any other uses and other working configurations are possible. System 500 is a preferably, but not exclusively, medical system comprising subject 502, selected region of interest (SRI) 504, input device 506, video data stream 508, computing device 510, user interface device (UID) 512, database 514 and user 516. Subject 502 is an image source such as an infant with a clinically evident heart murmur. Selected region of interest (SRI) 504 is a part of subject 502, such as the heart, from which video data stream 508 is obtained by input device 506 and is substantially large to be visualized by input device. SRI 504 typically is a body organ or cavity such as the brain, heart, kidney, blood vessel, abdomen, pelvis etc. Input device 506 is operative in acquiring physical data from selected region of interest 504 of subject 502 by physical means such as light capturing techniques, high frequency ultrasound wave resonance interpretation, Doppler shift interpretation, and radiation particles signature interpretation and so forth. Input device 506 is internally capable of converting this physical information into image data stream 508 records such as a two dimensional image, a there dimensional image, streaming two and three dimensional video and the like. Input device 506 can be an ECHO machine, such as a Sonos 2500 from HP, or system V from GE Medical and the like. Input device 506 in the example brought forth is an ECHO machine functional in extracting ultrasonic wave information regarding the heart of subject 502. In FIG. 5 video data stream 508 is illustrated as an output of input device 506 such as video images of the heart of subject 502. It should be evident to the person skilled in the art that input device 508 could have different output formats such as mathematical, textual and the like, used to represent measurements performed by physical measuring devices such as input device 508. Video data stream 508 is a serial image data record that when displayed to user 516 at a rate of at least 24 images per second is perceived by a human user 516 as real-time motion event of the image sequence. In the current example the data stream comprises a time related sequential collection of images of SRI 504 (heart) of subject 502. The data stream 508 is transmitted to computing device 510 by means known in the art such as a coaxial cable, infrared, wireless RF transmission and the like. Computing device 510 is operative in calculating complexity calculation (not shown) on at least a substantially small part of video data stream 508. The extent of this calculation could be predefined within device 508, could be dependent on the type on information received by device 508, and could be user-selected parts of video streams 508 displayed to the user 518 at real time. Next, computing device 510 calculates indicative parameter (not shown) and final result (not shown) as stated here and above. In the present example, indicative parameter is calculated based on complexity calculations of video data record 508 (streaming images of heart), predefined data base concerning selected region of interest 504 and subject 502 as well as input device 506 and so forth. At least a substantially small part of the predefined data is used for the calculation of an indicative parameter. Indicative parameter results as well as additional predefined data is used for the conversion of the indicative parameter result into the final result having a user-friendly format relating SRI 504 to be displayed to the user 516. Calculated results are then transferred to database 514, user interface device (UID) 512, other computing devices (not shown) through a computer network and the like, printed as hard copy (not shown) and the like. User 516 interacts with system 500 typically through UID 512 but also through input device 506. In the current example user 516 is a medical professional such as a radiologist handling input device 506 such as an ECHO machine in a manner resulting in the acquisition of correct images from selected region of interest 504. User 516 can view obtained data stream on the input device screen (not shown) as well as on UID 512. User 516 can also observe in real time final results of obtained data on UID 512 and reselect a new region of interest, correct attitude or location of examining input device 506 or subject 502 and the like. User 516 can also communicate with computing device 510 as well as database 514 through UID 512 for the purpose of changing predefined parameters, uploading saved data, comparing saved data to new acquired data, etc. UID 512 can be a software such as a graphical user interface device working on input device 506 or on computing device 510 as well as on an independent computing and displaying device such as a PC computer, Handheld device and the like. User 512 interacts with input device 506 and UID 512 by means known in the art such as a pointing device (mouse), a touch screen device (stylus), an audio device (microphone) and the like. In the illustrative example presented herein, user 516 is a radiologist handling input device 506 such as echo device over the surface of subject 502, a child with a heart murmur, in a specific location such that a selected region of interest 504 such as the heart is clearly viewed by input device 506. The user observes the input device screen (not shown) while collecting streaming image data records. The data is transferred to computing device 510 such as a computer of the input device where a series of calculations and database analysis is carried out and where final result is the final outcome. Final result (not shown) is then displayed to the user substantially immediately and therefore the user can decide whether the collected information is adequate. The final result can be a diagnosis such as a Ventricular Septal Defect (VSD) displayed as image and text, an indication for therapy such as a textual content describing the size of the VSD and the correct therapy indication, an evaluation of the VSD size over time such as the enlargement degree from the last examination etc.

It should be evident to the person skilled in the art that the illustration brought here and above is but an example and many other uses and configurations of the system are possible within the scope of the present invention.

We claim:

1. A medical diagnostics system having an imagery data analysis application operative in the processing of imagery data for generating meaningful imagery data summaries, the system comprising the elements of:
   at least one imagery input device to acquire imagery data of at least one subject and to transmit a stream of the acquired imagery data to at least one associated data processing apparatus;
   at least one data processing device associated with the at least one imagery input device, the data processing device comprising the elements of:
      at least one data storage device to store the stream of acquired imagery data, to store imagery data processing control parameters and to store programs constituting the imagery data analysis application;
      at least one processor device to process the stream of imagery data through the application of the at least one imagery data analysis application;
      an imagery data analysis application for the generation of meaningful summaries of the imagery data received from the at least one imagery input device, the imagery data analysis application comprises the elements of:
         an imagery data stream manipulation component to partition the distinct records of the stream of imagery data into specifically sized data blocks;
         a complexity calculation component to assign complexity values to the partitioned blocks of the imagery data records;
         an indicative parameter calculation component; and
         a final result generating component; and
   at least one user interface device to enable at least one user of the system to control suitably the operation of the system.

2. The system as claimed in claim 1 further comprises the element of at least one data communication network to enable remote access to imagery data control parameter sources across the network and to allow for the transmission of the imagery analysis result to remote targets across the network.

3. The system as claimed in claim 2 wherein the data communication network is a Local Area Network (LAN).

4. The system as claimed in claim 3 wherein the data communication network is a Wide Area Network (WAN).

5. The system as claimed in claim 1 further comprises the element of at least one imagery data recording device to allow for the recording of the imagery information.

6. The system as claimed in claim 1 further comprises the elements of at least one communication device to support a functional communication path to remotely located imagery data input devices, remotely located user interface devices, remotely located storage devices, and remotely located processing devices.

7. The system as claimed in claim 1 wherein the data processing device further comprises the element of an operating system to supervise the operation of the program executing in the data processing device.

8. The system as claimed in claim 1 wherein the imagery data comprises three-dimensional images.

9. The system as claimed in claim 8 wherein the imagery data comprises two-dimensional images.

10. The system as claimed in claim 1 wherein the imagery data comprises of still images.

11. The system as claimed in claim 10 wherein the imagery data comprises video.

12. The system as claimed in claim 11 wherein the imagery data includes audio elements.

13. The system as claimed in claim 12 wherein the imagery data includes textual elements.

14. The system as claimed in claim 1 wherein the imagery input device is a Computerized Axial Tomography (CAT) device.

15. The system as claimed in claim 14 wherein the imagery input device is a three dimensional ultra sound (3D US) device.

16. The system as claimed in claim 15 wherein the imagery input device is a Magnetic Resonance Imaging (MRI) device.

17. The system as claimed in claim 1 wherein the processor device is a Personal Computer (PC) device.

18. The system as claimed in claim 17 wherein the processor device is a microprocessor.

19. The system as claimed in claim 1 wherein the storage device is a magnetic/optical disk device.

20. The system as claimed in claim 1 wherein the storage device is a Synchronous Dynamic Random Access Memory (SDRAM) device.

21. The system as claimed in claim 1 wherein the imagery data control parameters include baseline imagery data.

22. A method for medical diagnosis utilizing an imagery analysis mechanism for the purpose of creating meaningful summaries of imagery data, the method comprising the steps of:
   acquiring a stream of imagery data of at least one subject via at least one imagery input device;
   processing the imagery data for the purpose of generating meaningful imagery data summaries, the processing comprises the steps of:
      partitioning an imagery data record into data blocks having identical size;
      assigning complexity values to the partitioned data blocks according to a pre-determined complexity factor;
      generating an indicative parameter based on the complexity values of the partitioned data blocks; and
      generating a final result to be displayed to at least one user;
   presenting the meaningful imagery summaries to at least one user.

23. The method as claimed in 22 wherein the step of processing further comprises the steps of:
   dividing at least one three dimensional image into at least two blocks;
   dividing each of the at the at least two blocks into at least three reading frames;
   calculating the complexity values of the at least three reading frames;
   whereby the complexity calculation of three-dimensional images is achieved.

24. The method as claimed in claim 22 further comprises the steps of:
   obtaining letter parameters from at least one three-dimensional image;
   dividing the at least one three-dimensional image into at least two blocks;
   dividing the at least two blocks into at least three reading frames;
   creating a word size list for the at least three reading frames each;
   utilizing word size lists and letter parameters for the calculation of the maximum different words possible.

25. The method as claimed in claim 22 further comprises the steps of:

obtaining shift parameters;

creating a word size value for at least three reading frames each;

utilizing the word size value to calculate the number of words;

calculating the number of words from the words and from the shift values.

26. The method as claimed in claim 22 wherein at least one user of the system selectively controls the processing of the stream of the imagery data.

27. The method as claimed in claim 22 wherein the processing of the stream of imagery data is performed controlled and enhanced via the utilization of imagery analysis control data parameters.

28. The method as claimed in claim 22 wherein the acquisition, processing, analysis, control, and display of the stream of imagery data is performed in a distributive manner across the at least one communications network.

29. The method as claimed in claim 22 wherein the at least one subject is a medical patient to be observed and to be diagnosed.

30. The method as claimed in claim 22 wherein the presentation of the meaningful summaries to the at least one user is utilized for the purposes of medical diagnosis, prognosis, and evaluation of responses to therapies.

31. The method as claimed in claim 22 wherein the presentation of the meaningful summaries to the at least one user is utilized for the purposes of guiding invasive or non-invasive therapeutic procedures.

* * * * *